United States Patent
Long et al.

(10) Patent No.: US 11,440,247 B2
(45) Date of Patent: Sep. 13, 2022

(54) ADDITIVE MANUFACTURING OBJECT CONDUCTIVITY

(71) Applicant: HEWLETT-PACKARD DEVELOPMENT COMPANY, L.P., Spring, TX (US)

(72) Inventors: Greg Scott Long, Corvallis, OR (US); Phil D Matlock, Corvallis, OR (US); Jake Wright, San Diego, CA (US); David L Erickson, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 123 days.

(21) Appl. No.: 16/605,064

(22) PCT Filed: Jan. 31, 2018

(86) PCT No.: PCT/US2018/016249
§ 371 (c)(1),
(2) Date: Oct. 14, 2019

(87) PCT Pub. No.: WO2019/152022
PCT Pub. Date: Aug. 8, 2019

(65) Prior Publication Data
US 2021/0129429 A1 May 6, 2021

(51) Int. Cl.
| B29C 64/165 | (2017.01) |
| B33Y 10/00 | (2015.01) |
| B33Y 80/00 | (2015.01) |
| B33Y 70/00 | (2020.01) |

(52) U.S. Cl.
CPC ............ *B29C 64/165* (2017.08); *B33Y 10/00* (2014.12); *B33Y 70/00* (2014.12); *B33Y 80/00* (2014.12); *B29K 2995/0005* (2013.01)

(58) Field of Classification Search
CPC ........ B29C 64/165; B33Y 10/00; B33Y 80/00
See application file for complete search history.

(56) References Cited

U.S. PATENT DOCUMENTS

| 9,176,405 B2 | 11/2015 | Nair et al. |
| 9,555,583 B1 | 1/2017 | Dirk et al. |
| 2011/0024696 A1 | 2/2011 | Molaire |

(Continued)

FOREIGN PATENT DOCUMENTS

| WO | WO2017180161 A1 | 10/2017 |
| WO | WO2017180164 A1 | 10/2017 |

*Primary Examiner* — Mary F Theisen
(74) *Attorney, Agent, or Firm* — HP Inc. Patent Department

(57) ABSTRACT

Some examples include an additive manufacturing method for controlling electrostatic discharge of a build object. The method includes receiving data related to a build object, the data including conductivity data, selectively depositing a first portion of a printing agent onto a build material layer in a pattern of an object layer of a build object, the printing agent being electrically conductive at a predetermined dosage, the first portion deposited at less than the predetermined dosage, selectively depositing a second portion of the printing agent onto the build material layer at an area of the pattern, the printing agent at the area deposited at or above the predetermined dosage, and applying fusing energy to form the object layer, the object layer of the build object including a shell formed at the area and a core, the shell being electrically conductive and the core being electrically non-conductive.

20 Claims, 4 Drawing Sheets

(56) References Cited

U.S. PATENT DOCUMENTS

| | | |
|---|---|---|
| 2014/0238833 A1 | 8/2014 | Virkar et al. |
| 2015/0135530 A1 | 5/2015 | Belanger |
| 2015/0144380 A1 | 5/2015 | Yang et al. |
| 2015/0366073 A1 | 12/2015 | Magdassi et al. |
| 2017/0015065 A1 | 1/2017 | Potter et al. |
| 2017/0253751 A1 | 9/2017 | Busbee et al. |
| 2017/0282456 A1 | 10/2017 | Wright et al. |

30 ↘

```
┌─────────────────────────────────────┐
│ RECEIVE DATA RELATED TO BUILD OBJECT,│─ 32
│ DATA INCLUDING CONDUCTIVITY DATA    │
└─────────────────────────────────────┘
              │
┌─────────────────────────────────────┐
│ SELECTIVELY DEPOSIT FIRST PORTION OF │
│ PRINTING AGENT ONTO BUILD MATERIAL  │
│ LAYER IN PATTERN OF OBJECT LAYER OF │
│ BUILD OBJECT, PRINTING AGENT BEING  │─ 34
│       ELECTRICALLY CONDUCTIVE AT    │
│ PREDETERMINED DOSAGE, FIRST PORTION │
│ DEPOSITED AT LESS THAN PREDETERMINED│
│              DOSAGE                 │
└─────────────────────────────────────┘
              │
┌─────────────────────────────────────┐
│   SELECTIVELY DEPOSIT SECOND PORTION│
│      OF PRINTING AGENT ONTO BUILD   │
│    MATERIAL LAYER AT AREA OF PATTERN,│─ 36
│   PRINTING AGENT AT AREA DEPOSITED AT│
│     OR ABOVE PREDETEMINED DOSAGE    │
└─────────────────────────────────────┘
              │
┌─────────────────────────────────────┐
│  APPLY FUSING ENERGY TO FORM OBJECT │
│  LAYER, OBJECT LAYER OF BUILD OBJECT│
│  INCLUDING SHELL FORMED AT AREA AND │─ 38
│    CORE, SHELL BEING ELECTRICALLY   │
│   CONDUCTIVITY AND CORE BEING       │
│    ELESTRICALLY NON-CONDUCTIVE      │
└─────────────────────────────────────┘
```

FIG. 3

ADDITIVE MANUFACTURING OBJECT CONDUCTIVITY

BACKGROUND

Additive manufacturing machines produce three dimensional (3D) objects by building up layers of material. Some additive manufacturing machines are commonly referred to as "3D printers". 3D printers and other additive manufacturing machines make it possible to convert a CAD (computer aided design) model or other digital representation of an object into the physical object. The model data may be processed into slices, each defining that part of a layer or layers of build material to be formed into the object.

BRIEF DESCRIPTION OF THE DRAWINGS

FIG. 3 is a flow chart of an example method of controlling electrostatic discharge of a build object in accordance with aspects of the present disclosure.

DETAILED DESCRIPTION

Figure 1A:
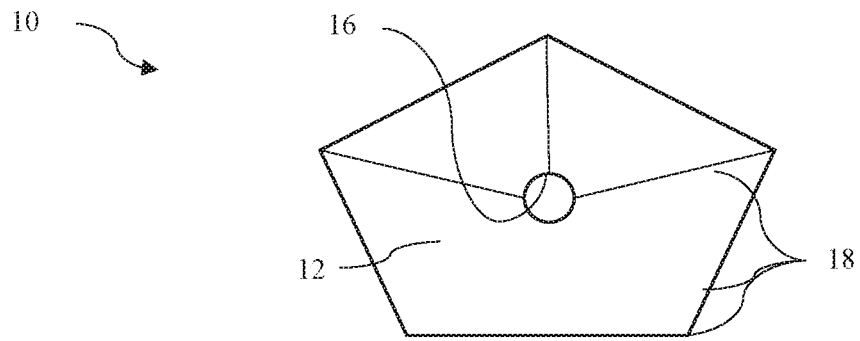
FIGS. 1A and 1B are side and cross-sectional views of an example build object in accordance with aspects of the present disclosure.

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

The present disclosure provides systems and methods for printing three dimensional (3D) objects, or parts, with electrically conductive features to manage electrostatic discharge of the build object. Build-up of an electrostatic charge can occur on the surfaces of an object. Uncontrolled or rapid discharge of an electrostatic charge can damage objects or components that aren't capable of withstanding receiving the electrostatic charge.

Systems and methods for printing 3D objects that include features to prevent a build-up of the electrostatic charge by creating surfaces that allow for manageable (e.g., slow and steady) discharge of the electrostatic charge are provided in the present disclosure. Various 3D printing technologies can differ in the way layers are deposited and fused, or otherwise solidified, to create a build object, as well as in the materials that are employed in each process. The descriptions and examples provided herein can be applied to various additive manufacturing technologies, environments, and materials to form a 3D object based on data of a 3D object model.

In an example additive manufacturing process, a build material and a printing agent can be deposited and heated in layers to form a build object. An example additive manufacturing technology can dispense a build material and spread the build material onto a build surface to form a layer of build material. A carriage system including a spreader to spread the build material and a dispenser (e.g., a printhead) to dispense the print material can be moved across the build surface, for example. The build surface can be a surface of a platen or underlying build layers of build material on a platen within a build chamber, for example. The example additive manufacturing technology can dispense a suitable printing agent in a desired pattern onto the layer of the build material. The build material can be a powder polymer-based type of build material. In some examples the powder may be formed from, or may include, short fibres that may, for example, have been cut into short lengths from long strands or threads of material. The build material can include plastics, ceramic, and metal powders (and powder-like materials). The printing agent can be an energy absorbing liquid that can be applied to the build material, for example. According to one example, a suitable printing, or fusing, agent may be an ink-type formulation comprising carbon black, such as, for example, the fusing agent formulation commercially known as V1Q60Q "HP fusing agent" available from HP Inc. The printing agent can be electrically conductive at certain concentrations or dosages and non-conductive at concentrations or dosages lower than useful to provide conductivity due to the carbon black or other suitable agent included in the printing agent.

The build material and the printing agent can be exposed to an energy source, such as a thermal energy source, for fusing. In some examples, sintering, or full thermal fusing, can be employed to melt and fuse small grains of build material particles (e.g., powders) together to form a solid object. When the printing agent is printed on a portion of the build material, the thermal energy source can heat the printed portion to a temperature at or above the melting or softening point, while the unprinted portions of the polymer powder remain below the melting or softening point. This provides for the formation of a solid 3D printed part, while the loose powder can be easily separated from the finished printed part.

The printing agent can facilitate fusing of the build material, where printed or applied, by absorbing energy from a fusing energy source and converting the energy to heat to raise the temperature of the build material above the melting or softening point. The thermal energy source can generate heat that is absorbed by fusing energy absorbing components of the printing agent to sinter, melt, fuse, or otherwise coalesce the patterned build material. In some examples, the energy source can apply a heating energy, to heat the build material to a pre-fusing temperature, and a fusing energy, to fuse the build material where the printing agent has been applied. Thermal, infrared, or ultraviolet energy can be used, for example, to heat and fuse the material. The thermal energy source can be mounted to the carriage system and moved across the build surface to apply the heating and fusing energies to the patterned build material. The patterned build material can solidify and form an object layer, or a cross-section, of a desired build object. The process is repeated layer by layer to complete the 3D build object.

Figure 1B:
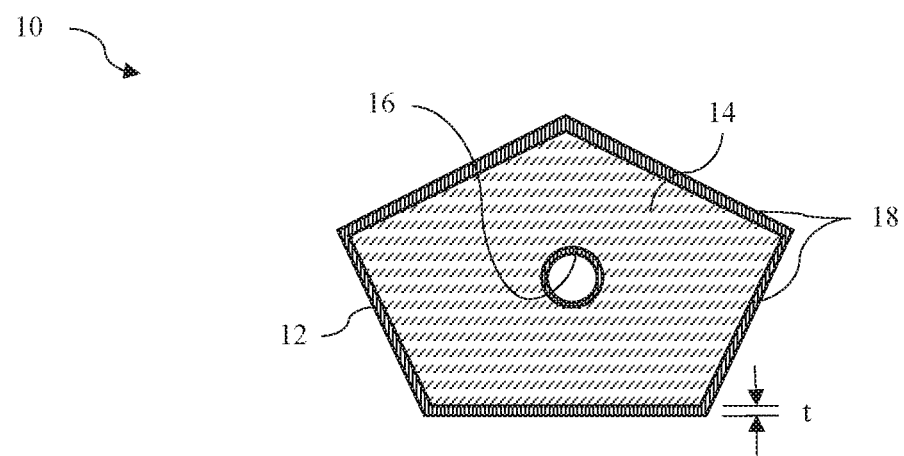

FIGS. 1A and 1B are side and cross-sectional views of an example build object 10 in accordance with aspects of the present disclosure. The build object 10 is formed during an additive manufacturing process in accordance with aspects of the present disclosure. The build object 10 includes a shell 12 and a core 14. The shell 12 has a first conductivity and the core 14 has a second conductivity. The first conductivity of the shell 12 is greater than the second conductivity of the core 14. The first conductivity can be obtained by an application and thermal fusing of printing agent applied at or above a predetermined electrically conductive dosage. The second conductivity can be obtained by an application and thermal fusing of printing agent at an electrically non-conductive dosage (i.e., below the predetermined electrically conductive dosage). In some examples, the core 14 can be substantially non-conductive at less than $10^9$ ohms/square (ohms/sq). The shell 12 can provide an enhanced conductivity over the core 14. The shell 12 has a greater conductivity than the core to provide electrostatic discharge or dissipation of the build object. In accordance with aspects of the present disclosure, an enhanced conductive Electro Static Dissipative (ESD) perimeter can be formed with the shell 12 of the build object 10.

The build object 10 can be any simple or complex shape that can be manufactured in an additive manufacturing machine. The shape of the build object 10 illustrated in FIGS. 1A and 1B is for illustrative purposes only and is not to be taken in a limiting sense. The shell 12 can be included at inner surfaces 16 and/or outer surfaces 18 of the build object 10 to form a conductive perimeter. The shell 12 can be formed at a total or partial outer, or exterior, surface 18 of the build object 10. The shell 12 can at least partially enclose the core 14. In one example, the shell 12 fully encloses the core 14. For example, the shell 12 can include the outer perimeter surfaces 18 of the build object 10 including a top, a bottom, and side surfaces of the build object 10. In one example, the shell 12 can form interior surfaces 16 of the build object 10, such as the interior surface 16 of a lumen. In some examples, the core 14 can be include the majority of the mass, or volume, of the build object 10. In some examples, the core 14 is encapsulated by the shell 12.

The shell 12 provides an enhanced conductivity over the core 14. The enhanced conductivity of the shell can be ESD capable. The shell 12 can be formed with increased dosages or concentrations of printing agent in selective areas of the build object 10 to increase the conductivity of the shell 12 over the conductivity of the core 14. The printing agent can be electrically conductive at predetermined dosages and concentrations. In one example, a first dosage, or portion, of the printing agent is deposited onto a layer of build material in a pattern of an object layer of the build object and a second dosage, or portion, of the printing agent is deposited onto the build material layer in a selective area of the pattern. The second portion of the printing agent can be delivered at the selective area to increase, or build, the conductivity in the selective area to form the conductive shell having a first conductivity higher than the second conductivity of the core. In one example, the selective area forming the shell can be included as part of the pattern of the object layer and the second portion can at least partially overlap the first portion. In another example, the second portion is selectively applied to an area that is outside of the pattern and the second portion is deposited to saturate the build material in the selective area to a greater saturation level than the build material in the pattern area forming the core. Additional portions of the printing agent can be applied at the selective area or as otherwise desired to selectively saturate the build material and increase conductivity. Printing the conductive shell around the core of the build object by increasing the dosage of the printing agent at the shell that is effectively hyper-concentrated, or hyper-saturated in comparison to the core provides the intrinsic conductivity of that printing agent to provide a shell that has a resistivity that is within a range of accepted or desired electrostatic discharge resistivity. The shell can have mechanical properties, such as surface finish and color, for example, different from those of the core due to the increased dosage of printing agent at the shell.

The printing agent can be conductive at certain concentrations or dosages, for example. In one example, the printing agent can include carbon black as a conductive fusing agent. Other conductive agents can also be used such as soluble organic or metallic based conductors, for example. Materials, or agents, that are "rated for electrostatic discharge" are classified as having a surface resistivity. The surface resistivity can be rated in ranges of ohms/sq. Surface resistivity can be inversely related to conductivity. In other words, an agent with high resistivity has low conductivity and vice-versa. Agents that are conductive can be resistive and yet conductive to a "degree" that prevents sudden discharge of electrostatic potential.

The shell 12 can be formed to have a thickness "t" suitable to provide the desired ESD and other properties of the build object 10. The thickness can be constant or varied. For example, the shell can have a greater thickness in one or more areas or surfaces (e.g., bottom surface) of the build object 10 than other areas or surfaces of the build object 10. The thickness can be determined by user or the additive manufacturing machine to achieve the desired ESD. The thickness can be formed with higher dosed printing agent corresponding to the desired electrostatic discharge resistivity of the build object 10. Increased shell thickness can have thermal impact to the build object with the additional dosage of printing agent potentially causing some cooling where applied. Maintaining a shell that is relatively thin as possible can minimize thermal impact and provide the desired mechanical and ESD properties. In one example, the shell 12 is desirably capable of withstanding abrasion without wearing through the shell 12, or diminishing the ESD capabilities below the desired level, during abrasion, for example, during the abrasion caused by bead blasting the build object 10 after printing.

The desired build object 10 and the desired ESD properties of the build object 10 can be selected by a user. In some examples, the user can select and/or input a desired build object 10 and/or build object surface resistivity characteristics into the additive manufacturing machine. The additive manufacturing machine can receive data related to the build object 10, including conductivity, or resistivity, data. The additive manufacturing machine can include processing capabilities to transform the user inputted information to determine the corresponding printing agent application dosage and patterns. In one example, the user would refer to a resistivity reference, or chart, of the additive manufacturing machine. The "degree" of conductivity can be determined.

In one example, a 3D object model can include data that defines the shell portion or other portion as being conductive. The additive manufacturing machine can receive the data and can transform the object model data to generate print data defining the locations and concentration of fusing agent to be printed in different regions, or portions, of a layer of build material. In another example, the user selects an option on the 3D printer indicating that a conductive shell is desired to be formed around, or on, an object. The 3D printer can transform print data of the 3D object model that controls the printheads to increase the concentration of fusing agent in the shell portion of the object.

In accordance with aspects of the present disclosure, the printing agent can form an electrostatic discharge capable "coating", or shell, of a build object in situ within the additive manufacturing machine after being printed onto the build material and fused into a solid state. During printing, heating, curing, and/or fusing the printing agent can form a conductive matrix that becomes interlocked with the fused build material where the dosage dispensed is appropriate to provide the desired conductivity features. The printed build layer can be cured by exposing the printed build layer to fusing energy. The conductive printing agent becomes fused, or interlocked, with the fused build material particles to form a conductive matrix. The conductive shell is formed where printing agent is applied at a dosage level greater than applied to the build material for fusing the build material together to form the core 14 of the build object 10.

The printing agent can be overprinted to increase the dosage of the printing agent, and correspondingly, increase the conductivity where overprinted. Overprinting includes printing or otherwise depositing the printing agent onto the build material layer in an amount, or dosage, greater than otherwise used for fusing purposes. Higher dosages can provide better conductivity due to a larger amount of conductive material being deposited on the build material. Saturation level, contone level, and thickness of the printing agent application forming the shell can be determined based on the user's specific application. In one example, the concentration of the conductive agent in the printing agent dispensed by the printhead or other dispenser remains the same throughout the printing process.

The concentration of the fusing component can be adjusted so that the fusing components are present in higher or lower amounts in the printing agent. The concentration can be adjusted based on a specific application. The concentration of the fusing component in the printing agent can be the same throughout the build process for both the core and the shell of the build object. The printing agent functions as a fusing agent and as a conductivity agent. The additional application of printing agent in the shell portion increases the printing agent in the desired shell portion. The area of additional printing agent dosage forming the shell is tunable, or adjustable, dependent on the desired ESD attributes of the build object which can be user determined and selected.)

In accordance with aspects of the present disclosure, Electro Static Dissipative (ESD capability of a build object can be digitally controlled at the voxel level. Microfluidic delivery of a printing agent can be employed to selectively control the application of the printing agent at certain dosages, layer by layer, to form a conductive shell of the build object. The conductive shell can provide an enhanced ESD perimeter for the build object. When a low surface resistivity, or higher ESD capability, is desired, a higher dosage of printing agent is use/dispensed. Printing the printing agent voxel by voxel can achieve various contone levels and can provide a simulation of a continuous tone. In order to achieve a maximum contone level (i.e., continuous tone), the inkjet pens can dispense the printing agent at the maximum firing frequency of the inkjet pens.

Figure 2:
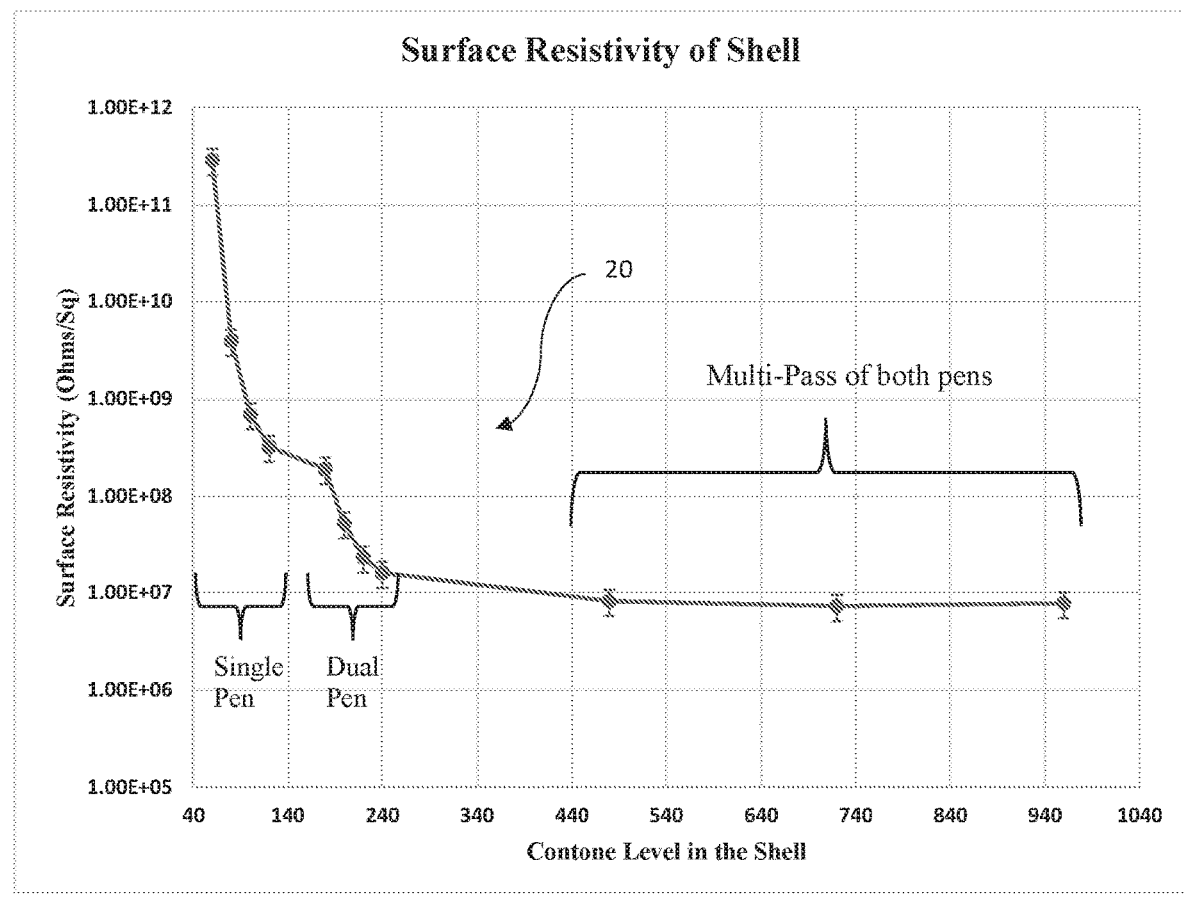
FIG. 2 is a graphical representation of an example surface resistivity of a shell of a build object at example contone levels in accordance with aspects of the present disclosure.

FIG. 2 is a graphical representation of an example surface resistivity of a shell of a build object at example contone levels in accordance with aspects of the present disclosure. The surface resistivity of the shell of an example build object at various contone printing agent levels is illustrated with a line 20. As indicated in FIG. 2, and as discussed further below, line 20 includes applying the printing agent with a single inkjet pen, dual inkjet pens, and multiple print passes of both single and dual inkjet pens.

In some additive manufacturing technologies, a printhead may be used to dispense the printing agent, such as a fusing agent or a binder, onto a formed layer of build material. When the printing agent is dispensed (e.g., printed) onto a layer of the build powder, the printing agent can penetrate into the spaces between the build powder particles. The printing agent is applied in a pattern of an object layer of a build object at the core and at the shell. The printing agent is deposited at less than the predetermined dosage in the pattern of the object layer to form the core portion of the object layer. The printing agent is deposited at or above the predetermined dosage in an area of the pattern, or outside of the pattern, to form the shell portion of the object layer. A higher level, or dosage, of the printing agent is applied at the shell than at the core to provide ESD capabilities at the shell. The increased application, or dosage, of printing agent at the shell builds the level of carbon black, or other effective ESD agent to provide surface resistivity decreased into the ESD capable range.

The printhead can include a single inkjet pen, for example, or multiple inkjet pens. The printhead may be carried on a moving carriage system. The printhead can be employed to selectively dispense the conductive fusing agent, or another kind of printing agent, and can be mounted to the moving carriage system to move across the print bed. In one example, the conductive printing agent can be printed from a greater number of slots, or pens, in an ink jet printer to increase the amount of the conductive agent deposited onto the build material print bed. In one example, multiple pens can dispense a first and second portions of the printing agent forming the core and the shell of an object layer in a single pass. Alternatively, additional passes of the printhead across the print bed can be employed to increase the amount of the conductive printing agent dispensed onto the build material print bed. In one example, a first pass of the printhead dispenses the first portion of the printing agent onto the build layer in a pattern of an object layer of the build object. A second pass of the printhead dispenses the second portion of the printing agent onto the build material layer at an area of the pattern. The area that the second portion is dispensed can at least partially overlap the pattern that first portion is dispensed to provide an increased dose of the printing agent at the area. In one example, the first portion and second portion, in combination, can be at or above the predetermined dosage. In another example, the second portion is at or above the predetermined dosage. Additional passes of the printhead and dispensing additional portions of the printing agent at the area, or subareas of the area, can be applied to decrease the surface resistivity of the shell to the desired level.

The surface resistivity of the shell can be decreased with additional passes of the printhead having single pen or with the use of multiple pens. FIG. 2 illustrates various example surface resistivity levels accomplished with dual pass, single pass, or multiple passes. Multiple pens in one pass can be faster than multiple passes with fewer pens. In one example, the printhead includes at least one fusing agent pen and at least one detailing agent pen. According to one example, a suitable fusing agent may be an ink-type formulation comprising carbon black, such as, for example, the fusing agent formulation commercially known as V1Q60Q "HP fusing agent" available from HP Inc. In one example, such a fusing agent may additionally comprise an infra-red light absorber. In one example such an ink may additionally comprise a near infra-red light absorber. In one example, such a fusing agent may additionally comprise a visible light absorber. In one example, such an ink may additionally comprise a UV light absorber. Examples of inks comprising visible light enhancers are dye based colored ink and pigment based colored ink, such as inks commercially known as CE039A and CE042A available from HP Inc. The detailing agent can be useful to control thermal aspects of a layer of build material (e.g., to provide cooling). According to one example, a suitable detailing agent may be a formulation commercially known as V1Q61A "HP detailing agent" available from HP Inc. According to one example, a suitable build material may be PA12 build material commercially known as V1R10A "HP PA12" available from HP Inc.

In one example, the shell is formed with printing agent dispensed from the at least one fusing agent pen. In one example, the additive manufacturing machine can accommodate fusing agent pens added to those originally included with the additive manufacturing machine. As illustrated, in one example, a surface resistivity of the shell generally remains at about 1.00E+07 and generally does not become more resistive with additionally increased contone levels.

Figure 4:
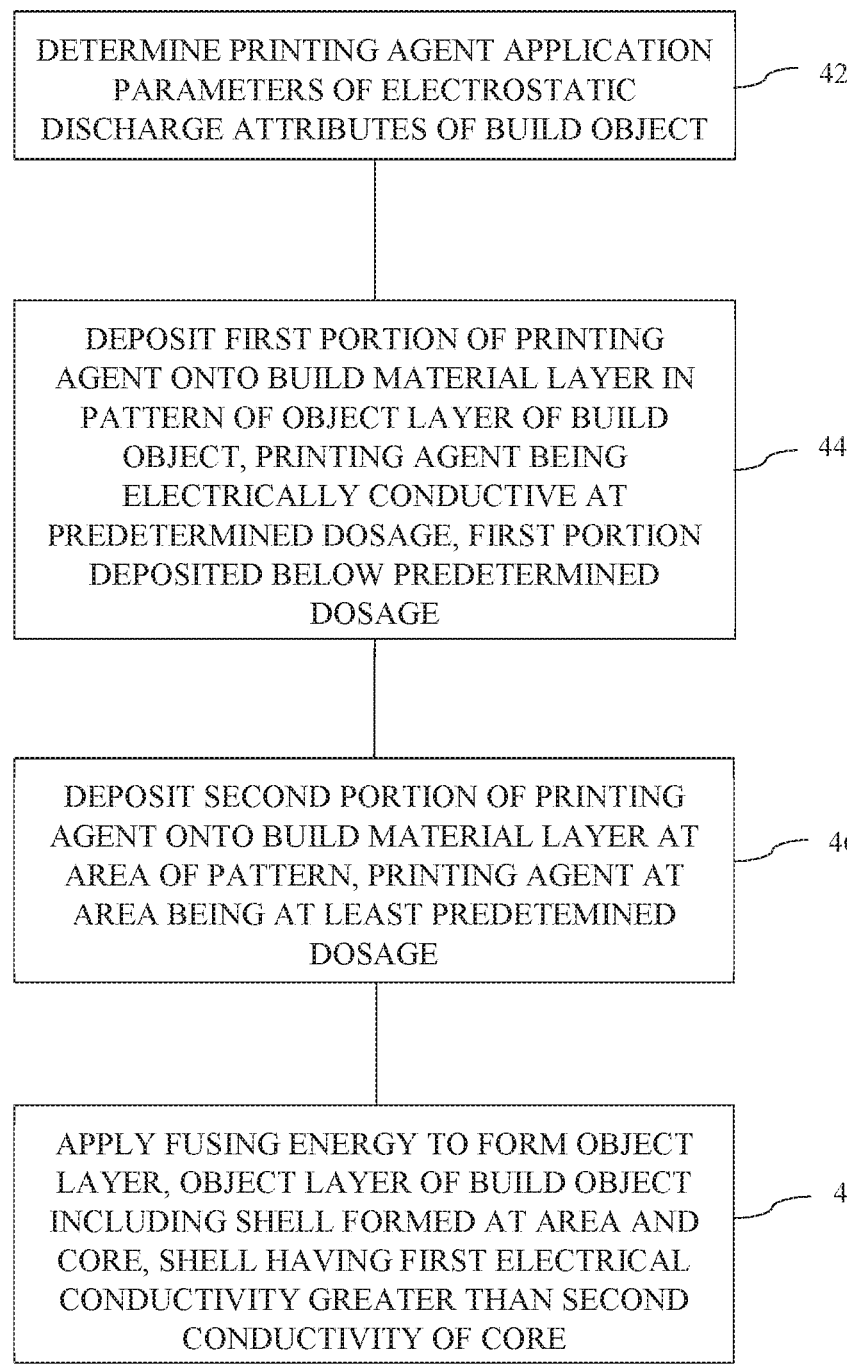
FIG. 4 is another flow chart of an example method of controlling electrostatic discharge of a build object in accordance with aspects of the present disclosure.

FIG. 3 is a flow chart of an example method 30 of controlling electrostatic discharge of a build object in accordance with aspects of the present disclosure. At 32, data related to a build object is received. The data can include conductivity data. At 34, a first portion of a printing agent is selectively deposited onto a build material layer in a pattern of an object layer of a build object, the printing agent being electrically conductive at a predetermined dosage. The first portion is deposited at less than the predetermined dosage. At 36, a second portion of the printing agent is selectively deposited onto the build material layer at an area of the pattern. The printing agent at the area is deposited at or above the predetermined dosage. At 38, a fusing energy is applied to form the object layer. The object layer of the build object includes a shell formed at the area and a core. The shell can be electrically conductive and the core can be electrically non-conductive FIG. 4 is another flow chart of an example method 40 of controlling electrostatic discharge of a build object in accordance with aspects of the present disclosure. At 42, printing agent application parameters corresponding to user selected build electrostatic discharge attributes of a build object are determined. At 44, a first portion of a printing agent is deposited onto a build material layer in a pattern of an object layer of the build object. The printing agent is electrically conductive at a predetermined dosage. The first portion deposited at a dosage below the predetermined dosage. At 46, a second portion of the printing agent is deposited onto the build material layer at an area of the pattern. The printing agent at the area can be at least the predetermined dosage. At 48, fusing energy is applied to form the object layer. The object layer of the build object includes a shell formed at the area and a core. The shell can have a first electrical conductivity greater than a second conductivity of the core.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. An additive manufacturing method for controlling electrostatic discharge of a build object, the method comprising:
   receiving data related to the build object, the data including conductivity data;
   selectively depositing a first portion of a printing agent onto a build material layer in a pattern of an object layer of the build object, the printing agent being electrically conductive at a predetermined dosage, the first portion deposited at less than the predetermined dosage;
   selectively depositing a second portion of the printing agent onto the build material layer at an area of the pattern, the printing agent at the area deposited at or above the predetermined dosage; and
   applying fusing energy to form the object layer, the object layer of the build object including a shell formed at the area and a core, the shell being electrically conductive and the core being electrically non-conductive.

2. The additive manufacturing method of claim 1, wherein the first and second portions are deposited in a single pass of a print agent dispenser across the build material layer.

3. The additive manufacturing method of claim 1, wherein the first portion is deposited prior to the second portion.

4. The additive manufacturing method of claim 1, wherein the second portion of the printing agent is deposited with the first portion.

5. The additive manufacturing method of claim 1, wherein the area is a perimeter of the pattern.

6. An additive manufacturing method for controlling electrostatic discharge of a build object, the method comprising:
   determining printing agent application parameters of electrostatic discharge of the build object;
   depositing a first portion of a printing agent onto a build material layer in a pattern of an object layer of the build object, the printing agent being electrically conductive at a predetermined dosage, the first portion deposited at a dosage below the predetermined dosage;
   depositing a second portion of the printing agent onto the build material layer at an area of the pattern, the printing agent at the area being at least the predetermined dosage; and
   applying fusing energy to form the object layer, the object layer of the build object including a shell formed at the area and a core in the pattern, the shell having a first electrical conductivity greater than a second conductivity of the core.

7. The additive manufacturing method of claim 6, comprising:
   depositing at least one additional portion of the printing agent to a selective area of the build material layer.

8. The additive manufacturing method of claim 6, wherein determining the printing agent application parameters includes determining a contone level of the second portion.

9. The additive manufacturing method of claim 6, wherein determining the printing agent application parameters includes determining a position of the area.

10. The additive manufacturing method of claim 6, wherein the depositing the second portion of the printing agent increases the conductivity of the first portion to the first electrical conductivity.

11. The additive manufacturing method of claim 6, wherein the build material layer at the shell has a higher concentration of the printing agent than the core.

12. An additive manufactured build object comprising:
   a shell having a first conductivity, the shell having the first conductivity formed with an electrically conductive printing agent having a dosage in a region of the shell at or exceeding a predetermined electrically conductive dosage, the shell including an exterior surface of the additive manufactured build object; and
   a core having a second conductivity less than the first conductivity, the core having the second conductivity formed with the electricallyconductive printing agent having an electrically non-conductive dosage in a region of the core at less than the predetermined electrically conductive dosage.

13. The additive manufactured build object of claim 12, wherein the shell at least partially encloses the core.

14. The additive manufactured build object of claim 12, wherein the shell has a thickness to provide the second conductivity.

15. The additive manufactured build object of claim 12, wherein the core is encapsulated by the shell.

16. The additive manufactured build object of claim 12, wherein the shell provides an electrostatic dissipative perimeter of the additive manufacturing build object.

17. The additive manufacturing method of claim 1, wherein the printing agent comprises a fusing agent and a conductivity agent.

18. The additive manufacturing method of claim 1, wherein the second portion of the printing agent forms a conductive matrix that becomes interlocked with a fused build material in the build material layer.

19. The additive manufacturing method of claim 1, wherein the shell fully or partially encloses the core.

20. The additive manufacturing method of claim 6, wherein the printing agent comprises a fusing agent and a conductivity agent.

* * * * *